United States Patent
Mitchell et al.

(10) Patent No.: US 10,412,100 B2
(45) Date of Patent: Sep. 10, 2019

(54) SYSTEM AND METHODS FOR PROVIDING SECURE DATA CONNECTIONS IN AN AVIATION ENVIRONMENT

(71) Applicant: The Boeing Company, Chicago, IL (US)

(72) Inventors: Timothy Mitchell, Seattle, WA (US); Gordon Edward Letney, Tacoma, WA (US); Kevin James Luschei, Bothell, WA (US); Timothy William Anstey, Seattle, WA (US); John Bush, Bothell, WA (US); Steve Magnuson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 15/225,397

(22) Filed: Aug. 1, 2016

(65) Prior Publication Data
US 2018/0034834 A1 Feb. 1, 2018

(51) Int. Cl.
*H04L 29/06* (2006.01)
*G06F 21/60* (2013.01)
*H04L 29/08* (2006.01)

(52) U.S. Cl.
CPC ........ *H04L 63/1416* (2013.01); *G06F 21/606* (2013.01); *H04L 63/1408* (2013.01); *H04L 67/2823* (2013.01)

(58) Field of Classification Search
CPC ........... G06F 21/60; G06F 21/50; H04L 63/00
USPC .......................................... 713/151; 726/2–7
See application file for complete search history.

(56) References Cited

U.S. PATENT DOCUMENTS

| 7,437,225 B1* | 10/2008 | Rathinam | G08G 5/0013 340/961 |
|---|---|---|---|
| 7,715,819 B2 | 5/2010 | Rockwell | |
| 7,761,200 B2 | 7/2010 | Avery et al. | |
| 8,314,730 B1* | 11/2012 | Musiak | G01S 7/003 342/25 B |

(Continued)

FOREIGN PATENT DOCUMENTS

EP 2978187 A1 1/2016

OTHER PUBLICATIONS

EP Extended Search Report for related application 17183546.5 dated Sep. 7, 2017, 8 pp.

*Primary Examiner* — Lynn D Feild
*Assistant Examiner* — Viral S Lakhia
(74) *Attorney, Agent, or Firm* — Armstrong Teasdale LLP (57) ABSTRACT

A secure communication management (SCM) computer device for providing secure data connections in an aviation environment which, includes safety of flight information, is provided. The SCM computer device includes a processor in communication with a memory. The processor is programmed to receive, from a first user computer device, a first data message for a first aircraft. The first data message is in a standardized data format. The processor is also programmed to analyze the first data message for potential cybersecurity threats. If the determination is that the first data message does not contain a cybersecurity threat, the processor is further programmed to convert the first data message into a first data format associated with the first aircraft and transmit the converted first data message to the first aircraft using a first communication protocol associated with the first aircraft.

15 Claims, 6 Drawing Sheets

(56) References Cited

U.S. PATENT DOCUMENTS

| | | |
|---|---|---|
| 8,340,854 B2 | 12/2012 | Doulatshahi et al. |
| 8,645,148 B2 | 2/2014 | Small et al. |
| 8,694,196 B1 | 4/2014 | Doulatshahi et al. |
| 9,100,361 B1* | 8/2015 | Lucchesi ................ H04L 63/00 |
| 9,369,484 B1* | 6/2016 | Lacerte ............... H04L 63/1416 |
| 9,798,329 B2* | 10/2017 | Shattil ................... B64C 39/024 |
| 10,250,619 B1* | 4/2019 | Park ..................... H04L 63/1416 |
| 2007/0152849 A1* | 7/2007 | McConnell ........... G06F 21/554 |
| | | 340/963 |
| 2009/0125169 A1* | 5/2009 | Edwards .............. G08G 5/0013 |
| | | 701/16 |
| 2009/0133112 A1* | 5/2009 | Kauffman ............ G08G 5/0013 |
| | | 726/11 |
| 2009/0201190 A1* | 8/2009 | Huthoefer ............... G01S 7/003 |
| | | 342/27 |
| 2010/0167723 A1* | 7/2010 | Soumier ............ H04B 7/18506 |
| | | 455/431 |
| 2010/0175006 A1* | 7/2010 | Li ........................... G06Q 10/10 |
| | | 715/764 |
| 2010/0318794 A1* | 12/2010 | Dierickx ................ B60R 25/04 |
| | | 713/164 |
| 2011/0047230 A1* | 2/2011 | McGee ............... H04L 41/0609 |
| | | 709/206 |
| 2012/0197896 A1* | 8/2012 | Li .................... H04L 29/08072 |
| | | 707/740 |
| 2014/0013431 A1* | 1/2014 | Bush ....................... G06F 21/00 |
| | | 726/23 |
| 2015/0215899 A1* | 7/2015 | Kumar .................. H04W 72/02 |
| | | 455/59 |
| 2015/0373122 A1* | 12/2015 | Steel .................... H04L 63/105 |
| | | 709/201 |
| 2016/0057160 A1* | 2/2016 | Buehler ............... H04L 63/1416 |
| | | 726/23 |
| 2017/0082745 A1* | 3/2017 | Kronfeld ................ G01S 13/953 |
| 2017/0183104 A1* | 6/2017 | Colby .................... B64D 45/00 |
| 2017/0235316 A1* | 8/2017 | Shattil ................... B64C 39/024 |
| | | 701/3 |

\* cited by examiner

SYSTEM AND METHODS FOR PROVIDING SECURE DATA CONNECTIONS IN AN AVIATION ENVIRONMENT

BACKGROUND

The field of the present disclosure relates generally to providing secure data connections in an aviation environment, and, more specifically, to managing data connections between ground-based computer networks and a plurality of aircraft.

Aviation platforms and infrastructures consist of many complex, networked, and hierarchical systems that perform various aviation computing needs. Some aviation platforms, such as aircraft standalone systems are migrating to e-Enabled networked aerospace approaches for greater operational performance efficiencies. The adoption of e-Enabled architectures and technologies increases the operational and performance efficiencies that results from being networked. The e-Enabling of aircraft systems with aerospace-specific and commercial networking solutions, enables communication between systems, across aircraft systems domain boundaries, and to ground-based systems.

However, the interconnection of aircraft systems domains and improved ability to communicate with on-board and off-board systems increases the risk of current and emerging cybersecurity attacks. Furthermore, different aircraft may use different communication protocols. These communication protocols may vary between airlines, types of aircraft, locations of individual aircraft, and even between different aircraft of the same type. These varying in communication protocols increase the risk of important communications not reaching their destination by being intercepted or corrupted in transit.

BRIEF DESCRIPTION

In one aspect, a secure communication management (SCM) computer device for providing secure data connections in an aviation environment is provided. The SCM computer device includes a processor in communication with a memory. The processor is programmed to receive, from a first user computer device, a first data message for a first aircraft. The first data message is in a standardized data format. The processor is also programmed to analyze the first data message for potential cybersecurity threats. If the determination is that the first data message does not contain a cybersecurity threat, the processor is further programmed to convert the first data message into a first data format associated with the first aircraft and transmit the converted first data message to the first aircraft using a first communication protocol associated with the first aircraft.

A method for providing secure data connections in an aviation environment is provided. The method is implemented using a secure communication management (SCM) computer device. The SCM computer device includes a processor in communication with a memory. The method includes receiving, from a first user computer device, a first data message for a first aircraft. The first data message is in a standardized data format. The method also includes analyzing the first data message for potential cybersecurity threats. If the determination is that the first data message does not contain a cybersecurity threat, the method further includes converting the first data message into a first data format associated with the first aircraft and transmitting the converted first data message to the first aircraft using a first communication protocol associated with the first aircraft.

In another embodiment, a system for providing secure data connections in an aviation environment is provided. The system includes an aircraft including at least one computer system that communicates via a first communication protocol. The system also includes a secure communication management (SCM) computer device that includes a processor in communication with a memory. The SCM computer device is configured to receive, from a first user computer device, a first data message for the aircraft. The first data message is in a standardized data format. The SCM computer device is also configured to analyze the first data message for potential cybersecurity threats. If the determination is that the first data message does not contain a cybersecurity threat, the SCM computer device is configured to convert the first data message into a first data format associated with the aircraft and transmit the converted first data message to the aircraft using a first communication protocol associated with the aircraft.

DETAILED DESCRIPTION

The implementations described herein relate to systems and methods for providing secure data connections in an aviation environment and, more specifically, to managing data connections between ground-based computer networks and a plurality of aircraft. More specifically, a secure communication monitoring ("SCM") computer device, also known as a SCM server, provides a communication interface between a plurality of aircraft and ground-based computer systems. The SCM computer device monitors communications between the plurality of aircraft and the ground-based computer systems for cybersecurity threats, provides secure communication channels between the plurality of aircraft and the ground-based systems, and routes messages between the ground-based systems and the plurality of aircraft using a plurality of communication protocols corresponding to the plurality of aircraft.

In some embodiments, the SCM computer device monitors communication traffic between a plurality of aircraft and one or more ground-based computer systems. The SCM computer device inspects communications from the one or more ground-based computer systems and from the plurality of aircraft to prevent passing on infected or compromised data. In some embodiments, the SCM computer device inspects the payload of one or more packets in the communication. The SCM computer device may also assemble messages that are divided over multiple packets to ensure that the data is not compromised or infected. In the example embodiment, the SCM computer device monitors communication traffic for aircraft while the corresponding aircraft is in flight and while the aircraft is on the ground, such as at a gate.

In the example embodiments, the SCM computer device acts as a real-time communication gateway and establishes one or more secure communication channels with each aircraft of the plurality of aircraft. In some embodiments, the SCM computer device establishes multiple secure communication channels with each aircraft based on the requirements of the corresponding aircraft. For example, different models of aircraft may have different communication requirements. In other examples, different airlines may require different communication protocols and/or formats. This airplane data includes "Safety of Flight" communications. These secure communication channels are required to maintain minimum separation standards within the allocated radio spectrum. Furthermore the data transmitted are categorized and prioritized based on regional and international standards. This data includes information that takes on a heighten level of security that does not tolerate or factor in an acceptable level of data loss. Accordingly, the system is configured for zero data loss. This is in contrast to other network systems, i.e. banking, commerce, entertainment and more, where some loss data can be tolerated and factored into the system requirements.

In the example embodiments, the SCM computer device monitors the established communication channels for communications from the corresponding aircraft. When the SCM computer device receives a communication from an aircraft, the SCM computer device analyzes the communication for potential cybersecurity threats. The SCM computer device reformats the communication and transmits the communications to its destination. In the example embodiment, SCM computer device stores information to identify a plurality of potential cybersecurity threats in a database. The database of identification information is configured to be updated on a regular basis to keep on top of the latest cybersecurity developments and discoveries.

The SCM computer device also monitors for communications to each of the aircraft. When the SCM computer device receives a communication for one of the aircraft, the SCM computer device analyzes the communication for potential cybersecurity threats. If the communication does not include any cybersecurity threats, the SCM computer device reformats the communication into a format that is associated with the secure communication channel to the aircraft. Then the SCM computer device transmits the communication over the corresponding secure communication channel.

If the SCM computer device detects a potential cybersecurity threat in a communication, the SCM computer device quarantines the communication. In some embodiments, the SCM computer device may raise an alarm, alert the transmitter of the potential cybersecurity threat, and/or clean the communication before transmitting the cleansed communication to its destination. The SCM computer device may also isolate the source of the communication The SCM computer device may log infected files for future analysis. In some embodiments, the SCM computer device may use trending to statistically identify threat vectors, so responses can be moved from long term analytical responses to real time responses, based on experience.

In some embodiments, when an aircraft lands, the aircraft transmits a plurality of operational data about the aircraft. For example, the aircraft may connect to a computer system at the gate and transmit the plurality of operational data to the connected computer system. In these embodiments, the operational data includes information about one or more flights of the associated aircraft. The plurality of operational data may be transmitted for later use by the airline or for use by one or maintenance crews to perform maintenance on the aircraft. In these embodiments, the SCM computer device receives the plurality of operational data from the aircraft for transmission to the airline or the maintenance crews. In some further embodiments, the SCM computer device stores the plurality of maintenance data from multiple aircraft. The SCM computer device may use this stored data to determine one or trends. Trends may include, but are not limited to, fuel burn which could indicate fuel impurities that could be isolated to an airport, country or fuel company; specific regions that may be associated with malicious cyber activity; specific times that may be associated with malicious or disruptive cyber activity; specific attacks on specific Air Navigation Service Providers (ANSP) including the FAA; specific airlines that have been the target of focused hacking efforts or denial of service attacks; and specific aircraft that have been the target of focused hacking efforts or denial of service.

Described herein are computer systems such as the SCM computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, the term "cybersecurity threat" includes an unauthorized attempt to gain access to a computer network or system. Cybersecurity threats, also known as cyber-attacks or cyber-threats, attempt to breach computer systems by taking advantage of vulnerabilities in the computer systems. Some cybersecurity threats include attempts to damage or disrupt a computer network or system. These cybersecurity threats may include, but are not limited to, active intrusions, spy-ware, mal-ware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing the computer system or remotely via a communications network.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

Figure 1:
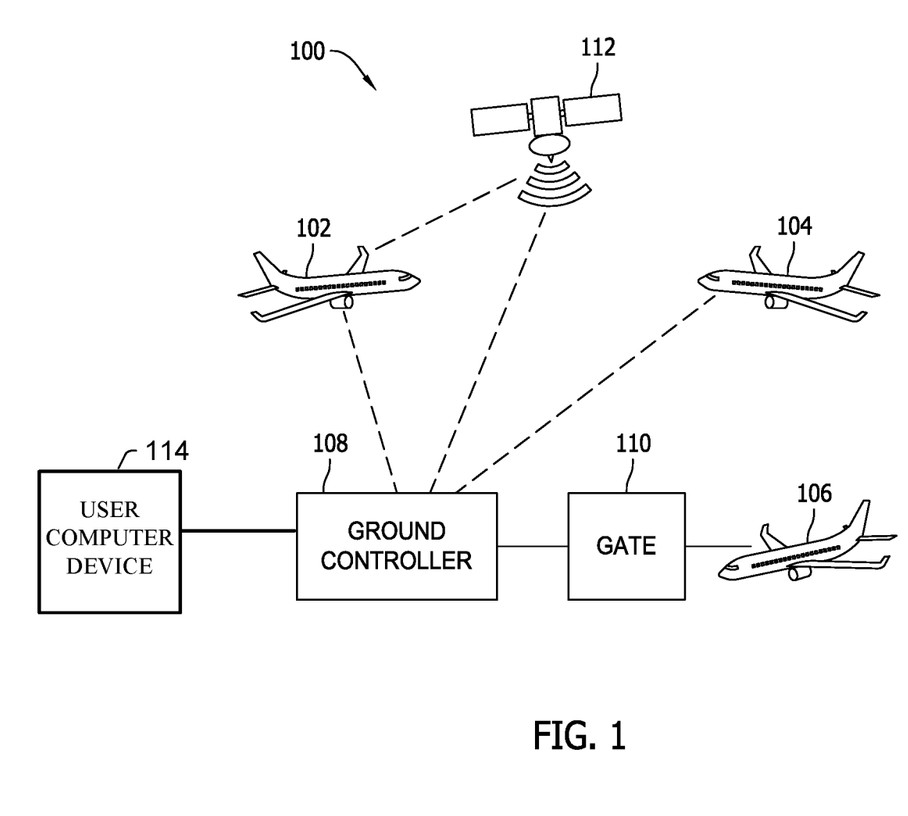
FIG. 1 illustrates a block diagram of an example overview of an aviation environment in accordance with one embodiment of the present disclosure.

FIG. 1 illustrates a block diagram of an example overview of an aviation environment 100 in accordance with one embodiment of the present disclosure. Aviation environment 100 includes a plurality of aircraft 102, 104, and 106, which are in communication with a ground controller 108. In the example embodiment, aircraft 102 and 104 are in-flight and aircraft 106 is at a gate 110. In some embodiments, in-flight aircraft 102 and 104 communicate with ground controller 108 through a cellular connection. In other embodiments, aircraft 102 communicates with ground controller 108 through satellite 112. In the example embodiment, aircraft 106 communicates with ground controller 108 through gate 110. In some embodiments, the connection to gate 110 is via a wireless connection. In other embodiments, the connection is a direct wired connection between aircraft 106 and gate 110. Gate 110 then relays data between ground controller 108 and aircraft 106. Gate 110 may communicate with ground controller 108 through the Internet through many interfaces including, but not limited to, at least one of a network, such as the Internet, a LAN, a WAN, an integrated services digital network (ISDN), a dial-up-connection, a digital subscriber line (DSL), a cellular phone connection, a satellite connection, and a cable modem.

In the some embodiments, communication between gate 110 and aircraft 106 is more desirable for large exchanges of information than the communication between in-flight aircraft 102 and 104 and ground controller 108. In these embodiments, critical information is communicated while aircraft 102 and 104 are in-flight, while general information is communicated once the aircraft is connected to a low-cost connection on the ground, such as at gate 110. For example, communication with aircraft 106 at gate 110 may be less expensive than communication while aircraft 102 and 104 is in flight. Gate based communication may also have higher bandwidth, faster speed, improved clarity, and different security than in-flight communication. In addition, the attributes of the communication with in-flight aircraft 102 and 104 may change based on the location of the corresponding aircraft 102 and 104, the weather patterns, and other phenomena that can affect communication and data transfer.

In the example embodiment, ground controller is also in communication with a plurality of user computer devices 114. Each of the plurality of user computer devices 114 is a different service or system that is configured to communicate with aircraft 102, 104, and 106. For example, user computer device 114 may be associated with an airline, a maintenance crew, a weather information system, an internet provider, a navigation system, a flight control system, and/or one or more other systems that need to communicate with an aircraft for its proper and reliable operation.

Figure 2:
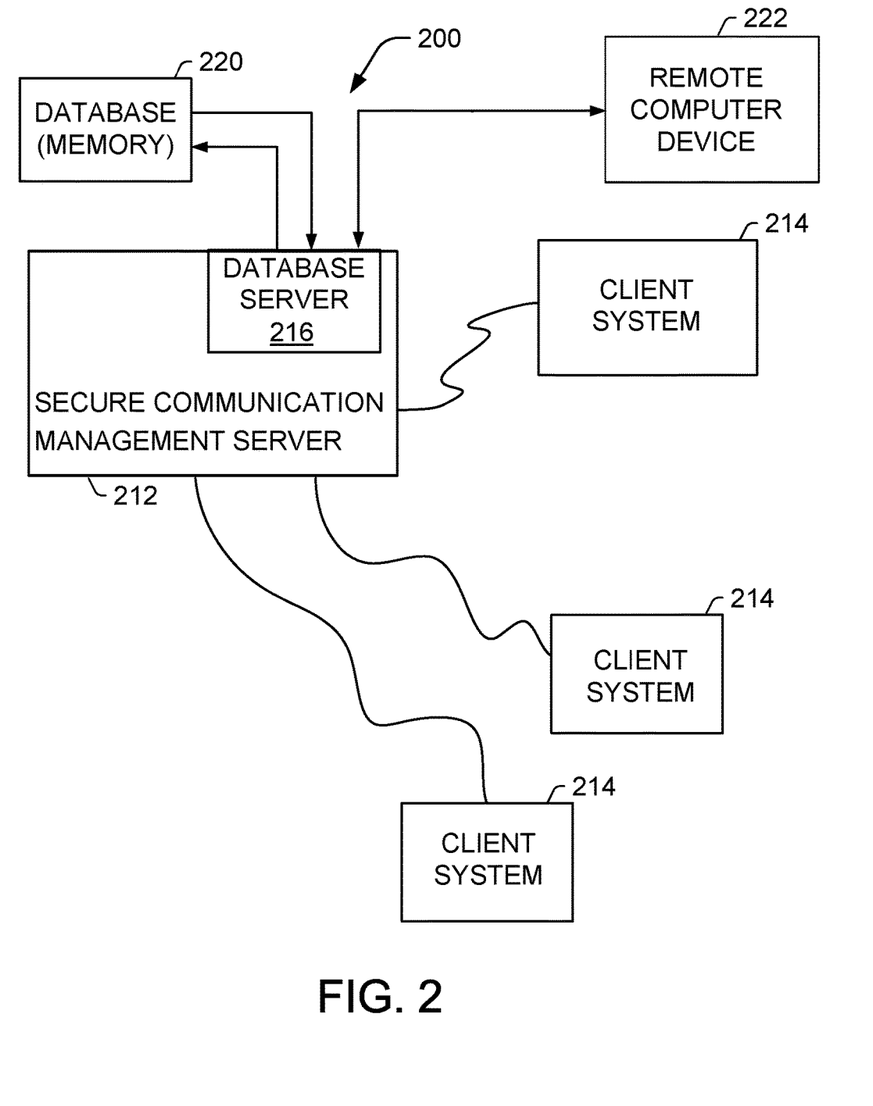
FIG. 2 is a simplified block diagram of an example system for providing secure data connections in the aviation environment shown in FIG. 1.

FIG. 2 is a simplified block diagram of an example system 200 for providing secure data connections in aviation environment 100 shown in FIG. 1. In the example embodiment, system 200 is used for monitoring communications for cyber-security threats and attacks, identifying detected cybersecurity threats and attacks, converting communication formats between different systems, and ensuring proper communication protocols are used between different systems. In addition, system 200 is a cyber-security monitoring system that includes a secure communication management (SCM) computer device 212 (also known as a SCM server) configured to monitor for cybersecurity threats and provide secure communications. As described below in more detail, SCM server 212 is configured to receive, from a user computer device 222, a data message for aircraft 102 (shown in FIG. 1). The data message is in a standardized data format. SCM server 212 is also configured to analyze the data message for potential cybersecurity threats. If the analysis is that the data message does not contain a cyber-security threat, SCM server 212 is further configured to convert the data message into a data format associated with aircraft 102 and transmit the converted data message to aircraft 102 using a communication protocol associated with aircraft 102.

In the example embodiment, client systems 214 are computers that include a web browser or a software application, which enables client systems 214 to communicate with SCM server 212 via cellular communication, satellite communication, the Internet, or a Wide Area Network (WLAN). In some embodiments, client systems 214 are communicatively coupled to SCM server 212 through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 214 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In the example embodiment, client systems 214 are computer systems included on aircraft 102, 104, and 106 (shown in FIG. 1). In some embodiments, client systems 214 are computer devices that control the operation of aircraft 102, 104, and 106.

In some embodiments, client systems 214 are known as line replaceable units (LRU). These client systems 214 include, but are not limited to, flight deck controls (Electronic Flight Bag), avionics data (satellite communication (SATCOM), Aircraft Communications Addressing and Reporting System (ACARS), and avionics), open networking (avionics interfaces, servers, terminal wireless, network appliances, and core network), maintenance (software loading and maintenance access), cabin and airline Services (Flight Operational Quality Assurance (FOQA) Data, FA terminals and crew wireless), Network File Servers (NFS), Mass Storage Devices (MSDs), Crew Wireless LAN Units (CWLUs), and Passengers (in-flight entertainment (IFE), Wi-Fi, and cell phones).

A database server 216 is communicatively coupled to a database 220 that stores data. In one embodiment, database 220 is a database that includes communication protocols, aircraft, cybersecurity threats, and historical data. In the example embodiment, database 220 is stored remotely from SCM server 212. In some embodiments, database 220 is decentralized. In the example embodiment, a person can access database 220 via client systems 214 or remote computer device 222 by logging onto SCM server 212.

In the example embodiment, SCM server 212 is communicatively coupled with a plurality of aircraft 102, 104, and 106 and remote computer devices 222. SCM server 212 acts as a gateway between the plurality of aircraft and remote computer devices 222. In the example embodiment, SCM server 212 provides secure communication links between aircraft 102, 104, and 106 and remote computer devices 222, while also filtering the communications to prevent cybersecurity threats. In the example embodiment, SCM server 212 establishes secure communication channels with each of aircraft 102, 104, and 106. The secure communication channels are two-way communication channels. In some embodiments, the secure communication channels transmit and receive encrypted data. In some further embodiments, the secure communication channels require authentication information to be included in communications. Secure communication channels may be secured in other methods to allow the systems and methods described herein to function. In some embodiments, SCM server 212 is similar to ground-based computer systems, such as ground controller 108 (shown in FIG. 1). In some embodiments, SCM server 212 includes a plurality of computer systems in a network to allow the systems and methods to work as described herein.

SCM server 212 is also in communication with remote computer devices 222. In some embodiments, remote computer device 222 is user computer device 114, shown in FIG. 1. In the example embodiment, remote computer device 222 is configured to communicate with at least one of aircraft 102, 104, and 106 through SCM server 212. Remote computer device 222 is configured to communicate with SCM server 212 via using the Internet. In some embodiments, remote computer devices 222 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Remote computer device 222 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment.

In the example embodiment, remote computer device 222 is associated with the plurality of aircraft. For example, remote computer device 222 is associated with the airline associated with the plurality of aircraft. In other embodiments, remote computer device 222 is just in communication with the plurality of aircraft, such as a weather information computer device. In other embodiments, remote computer device 222 is not associated with an aircraft, but instead associated with any computer network of networked computer devices that operate as described herein. For example, remote computer device 222 may be associated with an airline, a maintenance crew, a weather information system, an internet provider, a navigation system, a flight control system, and/or one or more other systems that need to communicate with an aircraft for its proper and reliable operation.

Figure 3:
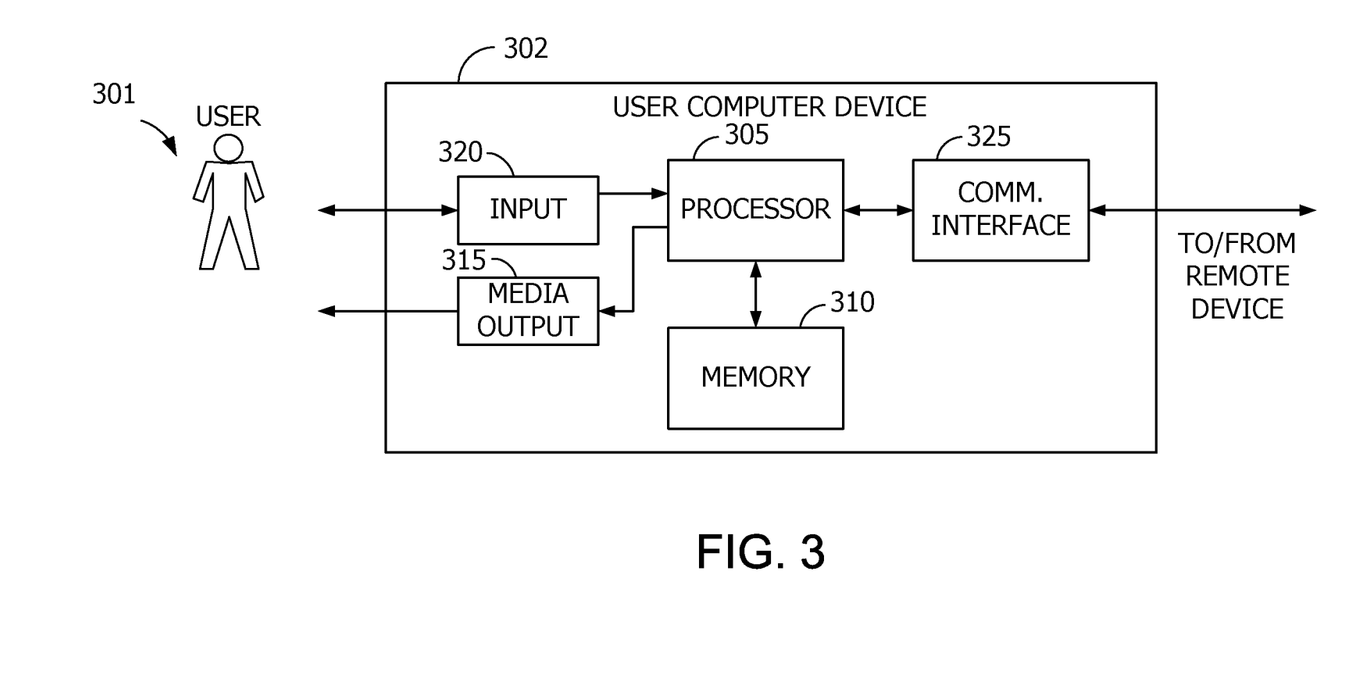
FIG. 3 illustrates an example configuration of a client computer device shown in FIG. 2, in accordance with one embodiment of the present disclosure.

FIG. 3 illustrates an example configuration of client system 214 shown in FIG. 2, in accordance with one embodiment of the present disclosure. User computer device 302 is operated by a user 301. User computer device 302 may include, but is not limited to, client systems 214 (shown in FIG. 2), user computer device 114 (shown in FIG. 1), and remote computer device 222 (shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as SCM server 212 (shown in FIG. 2). Communication interface 325 may also be in communication with a control system (not shown) of an aircraft, such as aircraft 102 shown in FIG. 1, where user computer device 302 provides instructions to and receives data from the control system. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from SCM server 212. A client application allows user 301 to interact with, for example, SCM server 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
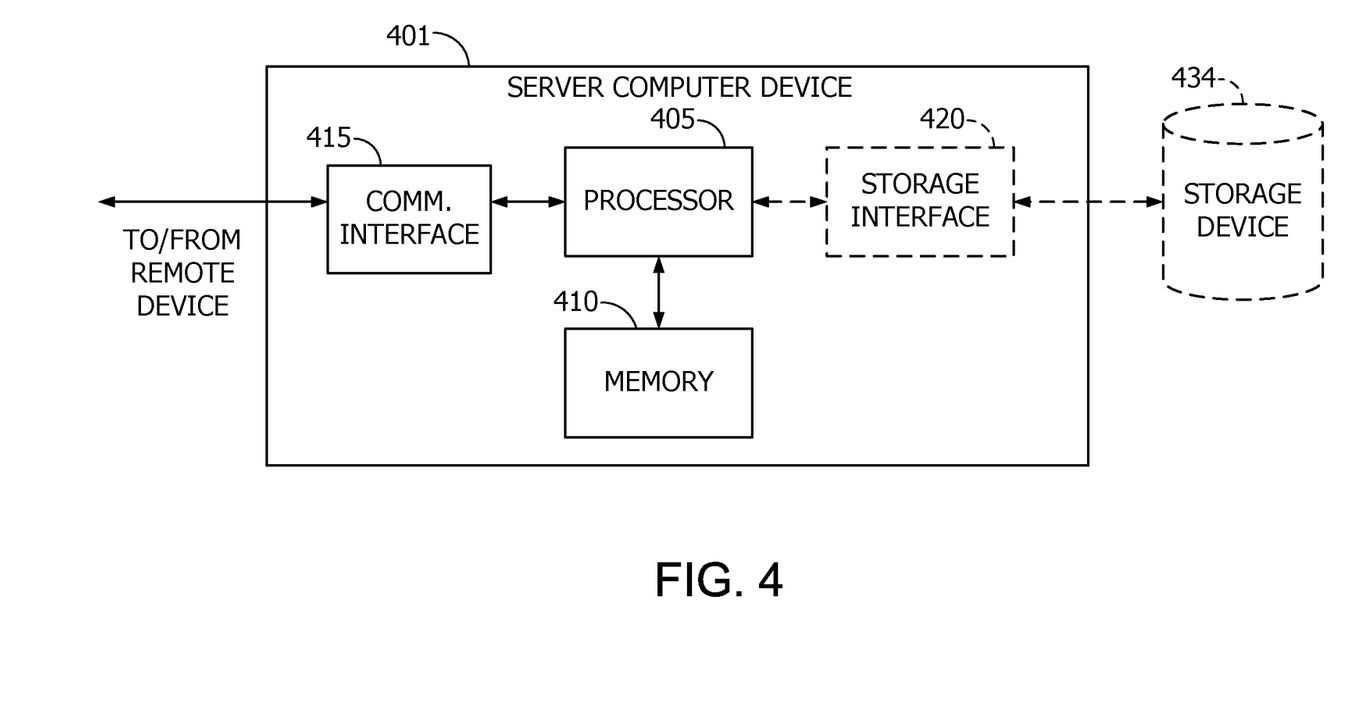
FIG. 4 illustrates an example configuration of the server system shown in FIG. 2, in accordance with one embodiment of the present disclosure.

FIG. 4 illustrates an example configuration of the server system 212 shown in FIG. 2, in accordance with one embodiment of the present disclosure. Server computer device 401 may include, but is not limited to, database server 216, SCM server 212, remote computer device 222 (all shown in FIG. 2), ground controller 108, and user computer device 114 (both shown in FIG. 1). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, another SCM server 212, remote computer device 222, or client system 214 (shown in FIG. 2). For example, communication interface 415 may receive requests from remote computer device 222 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instruction such as illustrated in FIG. 5.

Figure 5:
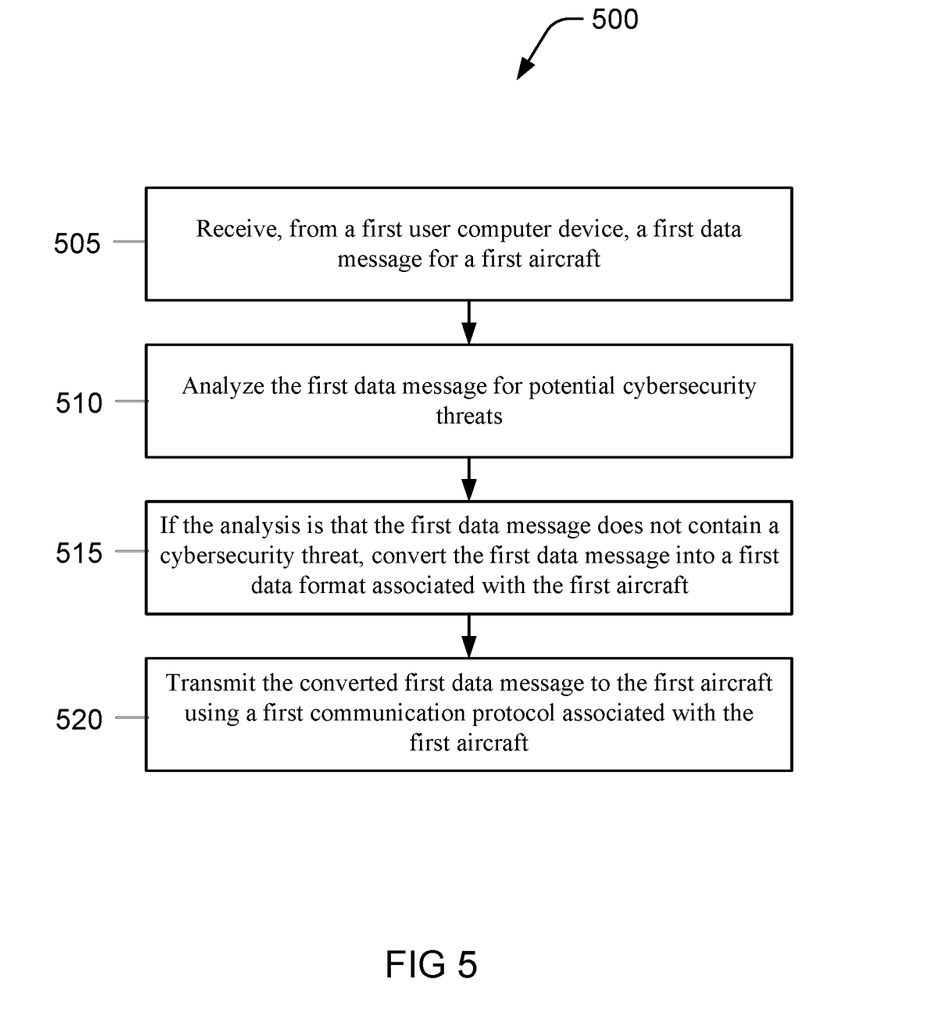
FIG. 5 is a flowchart illustrating an example of a process of providing secure data connections in the aviation environment shown in FIG. 1 using the system shown in FIG. 2.

FIG. 5 is a flowchart illustrating an example of a process 500 of providing secure data connections in aviation environment 100 (shown in FIG. 1) using system 200 shown in FIG. 2. Process 500 may be implemented by a computing device, for example SCM server 212 (shown in FIG. 2).

In the example embodiment, SCM server 212 receives 505 a data message destined for a first aircraft 102. In the example embodiment, the data message includes one or more packets. The data message is received 505 from a remote computer device 222 (shown in FIG. 2), such as user computer device 114 (shown in FIG. 1). In some embodiments, the data message is information for first aircraft 102, such as navigational information and/or weather information. In other embodiments, the data message is requested information or ongoing communication with one or more occupants of first aircraft 102, such as through an in-flight Internet service.

In the example embodiment, SCM server 212 analyzes 510 the data message for potential cybersecurity threats. SCM server 212 compares the data message to known cybersecurity threats. In some embodiments, SCM server 212 analyzes 510 the payload of the data message. And in some further embodiments, SCM server 212 combines and/or reassembles multiple packets to analyze. In some embodiments, SCM server 212 analyzes 510 by comparing the data message to one or more known cybersecurity threats, whose identifiers are stored in database 220.

If the analysis is that the first data message does not contain a cybersecurity threat, SCM server 212 converts 515 the data message into a data format associated with first aircraft 102. In the example embodiment, different models of aircraft 102, 104, and 106 communicate via different communication protocols and may require the data message to be in different data formats for the different communication protocols. In addition, different services, such as, but not limited to, navigation, weather conditions, in-flight Internet, and other communications, require different data formats or communication protocols between ground based systems, such as SCM server 212 and the destination aircraft 102. In the example embodiments, SCM server 212 transmits 520 the converted data message to first aircraft 102 using a first communication protocol associated with first aircraft 102.

In the example embodiment, SCM server 212 facilitates two-way communication between first aircraft 102 and remote computer device 222. In this embodiment, SCM server 212 receives data messages from first aircraft 102 to be transmitted to remote computer device 222. SCM server 212 analyzes the received data message for potential cybersecurity threats. If the determination is that the data message does not contain a cybersecurity threat, SCM server 212 converts the data message into the standardized data format and transmits the converted data message to remote computer device 222.

In some embodiments, SCM server 212 receives a data message to be transmitted to multiple aircraft, such as weather information. SCM server 212 converts the data message into a first data message for first aircraft 102 and a second data message for second aircraft 104, before transmitting the corresponding message to the corresponding aircraft. In some embodiments, first aircraft 102 and second aircraft 104 communicate with SCM server 212 using different communication protocols. In some embodiments, the first data message for first aircraft 102 and second data message for second aircraft 104 have different formats. In some embodiments, first aircraft 102 is associated with a first airline and second aircraft 104 is associated with a second airline. These differences may be due to difference between the models and/or systems of first aircraft 102 and second aircraft 104. In other embodiments, first aircraft 102 and second aircraft 104 may be flying in different geographic regions and those regions may have different communication requirements. Further embodiments, may change the communication protocol due to the location of transceivers on the ground that SCM server 212 may use to communicate with first aircraft 102 and second aircraft 104.

In some embodiments, SCM server 212 stores the communication protocols associated with each aircraft in database 220 (shown in FIG. 2). When SCM server 212 receives 505 a message to transmit to the aircraft 102, SCM server 212 uses database 220 to determine the format and communication protocol associated with that aircraft 102.

In some embodiments, if SCM server 212 detects a potential cybersecurity threat in a communication, SCM server 212 quarantines the communication. In some embodiments, SCM server 212 may raise an alarm, alert the transmitter of the potential cybersecurity threat, and/or clean the communication before transmitting the cleansed communication to its destination. SCM server 212 may also isolate the source of the communication to prevent further communication. SCM computer device 212 may log infected files for future analysis. In some embodiments, SCM computer device 212 may use trending to statistically identify threat vectors, so responses can be moved from long term analytical responses to real time responses, based on experience.

In some embodiments, when aircraft 106 lands, aircraft 106 transmits a plurality of operational data about aircraft 106. For example, aircraft 106 may connect to a computer system at gate 110 (shown in FIG. 1) and transmit the plurality of operational data to the connected computer system. In these embodiments, the operational data includes information about one or more flights of aircraft 106. The plurality of operational data may be transmitted to remote computer device 222 for later use by the airline or for use by one or maintenance crews to perform maintenance on aircraft 106. Before transmission the plurality of operational data is analyzed by SCM server 212 for potential cybersecurity threats. In these embodiments, SCM server 212 receives the plurality of operational data from aircraft 106 for transmission to the airline or the maintenance crews. In some further embodiments, SCM server 212 receives a plurality of maintenance data from multiple aircraft 102, 104, and 106, and stores the plurality of maintenance data from multiple aircraft 102, 104, and 106. SCM server 212 may use this stored data to determine one or trends. Trends may include, but are not limited to, fuel burn which could indicate fuel impurities that could be isolated to an airport, country or fuel company; specific regions that may be associated with malicious cyber activity; specific times that may be associated with malicious or disruptive cyber activity; specific attacks on specific Air Navigation Service Providers (ANSP) including the FAA; specific airlines that have been the target of focused hacking efforts or denial of service attacks; and specific aircraft that have been the target of focused hacking efforts or denial of service. The trend data may be transmitted to remote computer device 222.

Figure 6:
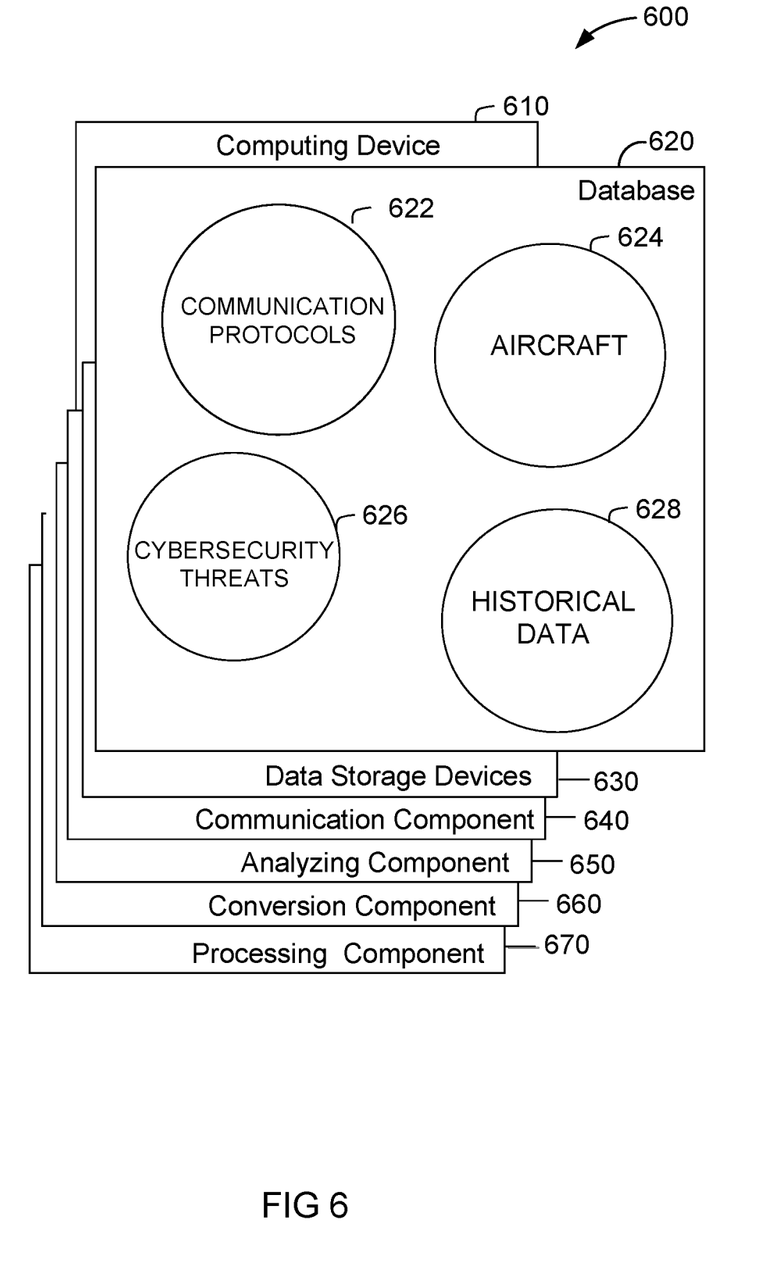
FIG. 6 is a diagram of components of one or more example computing devices that may be used in the system shown in FIG. 2.

FIG. 6 is a diagram 600 of components of one or more example computing devices that may be used in the system 200 shown in FIG. 2. In some embodiments, computing device 610 is similar to SCM server 212 (shown in FIG. 2). Database 620 may be coupled with several separate components within computing device 610, which perform specific tasks. In this embodiment, database 620 includes communication protocols 622, aircraft 624, cybersecurity threats 626, and historical data 628. In some embodiments, database 620 is similar to database 220 (shown in FIG. 2).

Computing device 610 includes the database 620, as well as data storage devices 630. Computing device 610 also includes a communication component 640 for receiving 505 a first data message and transmitting 520 the converted first data message (both shown in FIG. 5). Computing device 610 also includes an analyzing component 650 for analyzing 510 the first data message (shown in FIG. 5). Computer device 610 further includes a conversion component 660 for converting 515 the first data message (shown in FIG. 5). A processing component 670 assists with execution of computer-executable instructions associated with the system.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described above, the implementations described herein relate to systems and methods for providing secure data connections in an aviation environment and, more specifically, to managing data connections between ground-based computer networks and a plurality of aircraft. More specifically, a secure communication monitoring ("SCM") computer device provides a communication interface between a plurality of aircraft and ground-based computer systems. The SCM computer device monitors communications between the plurality of aircraft and the ground-based computer systems for cybersecurity threats, provides secure communication channels between the plurality of aircraft and the ground-based systems, and routes messages between the ground-based systems and the plurality of aircraft using a plurality of communication protocols corresponding to the plurality of aircraft.

The above-described methods and systems for providing secure data connections in an aviation environment are cost-effective, secure, and highly reliable. The methods and systems include routing through the above-mentioned SCM computer device to increase the accuracy of the transmitted information, reduce the number of systems that interact with aviation-based computer systems, provide for a reduces number of computer systems that require cybersecurity upgrades, and greatly increase the security of information transmitted to and from aircraft. Accordingly, the methods and systems facilitate secure communications in an aviation environment in a cost-effective and reliable manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A secure communication management (SCM) computer device for providing secure data connections to a plurality of aircraft, said SCM computer device comprising a processor in communication with a memory, wherein said SCM computer device is remote from the plurality of aircraft and wherein said SCM computer device is ground-based, said processor programmed to:
receive, from a user computer device, a first data message for a first aircraft and a second aircraft of the plurality of aircraft, wherein the first aircraft and the second aircraft are remote from the user computer device and said SCM computer device, wherein the first aircraft is located in a first geographic region and the second aircraft is located in a second geographic region, wherein the first geographic region and the second geographic region are different, and wherein the first data message is in a standardized data format;
analyze the first data message for potential cybersecurity threats; and
if the analysis is that the first data message does not contain a cybersecurity threat, the processor is programmed to:
convert the first data message into a first data format associated with the first aircraft;
transmit, via a remote connection with the first aircraft, the converted first data message to the first aircraft using a first communication protocol associated with the first aircraft;
convert the first data message into a second data format associated with the second aircraft; and
transmit, via a remote connection with the second aircraft, the converted first data message to the second aircraft using a second communication protocol associated with the second aircraft, wherein the first communication protocol and the second communication protocol are different.

2. A SCM computer device in accordance with claim 1, wherein the first aircraft is associated with a first airline and wherein the second aircraft is associated with a second airline.

3. A SCM computer device in accordance with claim 1, wherein the processor is further programmed to:
receive a second data message from the first aircraft;
analyze the second data message for potential cybersecurity threats;
if the determination is that the second data message does not contain a cybersecurity threat, convert the second data message into the standardized data format; and
transmit the converted second data message to the user computer device.

4. A SCM computer device in accordance with claim 1, wherein the processor is further programmed to determine a communication protocol and data format associated with the corresponding aircraft.

5. A SCM computer device in accordance with claim 1, wherein the processor is further programmed to:
receive a plurality of data from a plurality of aircraft;
analyze the plurality of data to determine one or more trends; and
transmit the determined one or more trends to the user computer device.

6. A SCM computer device in accordance with claim 1, wherein the processor is further programmed to:
receive a plurality of data from the first aircraft where the first aircraft is at a gate;
analyze the plurality of data for potential cybersecurity threats;
if the determination is that the plurality of data does not contain any cybersecurity threats, convert the plurality of data into the standardized data format; and
transmit the converted plurality of data to the user computer device.

7. A SCM computer device in accordance with claim 6, wherein the plurality of data includes one or more operating conditions of the corresponding aircraft.

8. A SCM computer device in accordance with claim 1, wherein the first aircraft is in flight.

9. A SCM computer device in accordance with claim 1, wherein the user computer device is associated with at least one of an airline associated with the first aircraft and at least one maintenance system associated with the first aircraft.

10. A method for providing secure data to a plurality of aircraft, said method implemented using a secure communication management (SCM) computer device, said SCM computer device comprising a processor in communication with a memory, wherein said SCM computer device is remote from the plurality of aircraft and wherein said SCM computer device is ground-based, said method comprising:
receiving, from a user computer device, a first data message for a first aircraft and a second aircraft of the plurality of aircraft, wherein the first aircraft and the second aircraft are remote from the user computer device and the SCM computer device, wherein the first aircraft is located in a first geographic region and the second aircraft is located in a second geographic region, wherein the first geographic region and the second geographic region are different, and wherein the first data message is in a standardized data format;

analyzing, by the SCM computer device, the first data message for potential cybersecurity threats; and if the analysis is that the first data message does not contain a cybersecurity threat, the method further comprises:

converting, by the SCM computer device, the first data message into a first data format associated with the first aircraft;

transmitting, via a remote connection between the SCM computer device and the first aircraft, the converted first data message to the first aircraft using a first communication protocol associated with the first aircraft;

converting the first data message into a second data format associated with the second aircraft; and     transmitting, via a remote connection with the second aircraft, the converted first data message to the second aircraft using a second communication protocol associated with the second aircraft, wherein the first communication protocol and the second communication protocol are different.

11. The method in accordance with claim 10 further comprising:

receiving a second data message from the first aircraft;

analyzing the second data message for potential cybersecurity threats;

if the determination is that the second data message does not contain a cybersecurity threat, converting the second data message into the standardized data format; and transmitting the converted second data message to the user computer device.

12. The method in accordance with claim 10 further comprising:

receiving a plurality of data from the first aircraft where the first aircraft is at a gate;

analyzing the plurality of data for potential cybersecurity threats;

if the determination is that the plurality of data does not contain any cybersecurity threats, converting the plurality of data into the standardized data format; and transmitting the converted plurality of data to the user computer device.

13. The method in accordance with claim 12, wherein the plurality of data includes one or more operating conditions of the corresponding aircraft.

14. A system for providing secure data connections in an aviation environment, said system comprising:

a first aircraft including at least one computer system that communicates via a first communication protocol;

a second aircraft including at least one computer system that communicates via a second communication protocol, wherein the first communication protocol is different from the second communication protocol, wherein the first aircraft is located in a first geographic region and the second aircraft is located in a second geographic region, wherein the first geographic region and the second geographic region are different;

a secure communication management (SCM) computer device comprising a processor in communication with a memory, wherein said SCM computer device is remote from said first aircraft and said second aircraft, and wherein said SCM computer device is ground-based, said SCM computer device configured to:

receive, from a user computer device, a first data message for said first aircraft and said second aircraft, wherein said first aircraft and said second aircraft are remote from the user computer device, wherein the first data message is in a standardized data format;

analyze the first data message for potential cybersecurity threats; and if the analysis is that the first data message does not contain a cybersecurity threat, said SCM computer device configured to:

convert the first data message into a first data format associated with said first aircraft;

transmit, via a remote connection with said first aircraft, the converted first data message to said first aircraft using the first communication protocol;

convert the first data message into a second data format associated with said second aircraft; and     transmit, via a remote connection with said second aircraft, the converted first data message to said second aircraft using the second communication protocol.

15. A system in accordance with claim 14, wherein said SCM computer device is further configured to:

receive a second data message from said first aircraft;

analyze the second data message for potential cybersecurity threats;

if the determination is that the second data message does not contain a cybersecurity threat, convert the second data message into the standardized data format; and transmit the converted second data message to the user computer device.

* * * * *